United States Patent Office 2,921,928
Patented Jan. 19, 1960

---

2,921,928

PREPARATION OF COPOLYMER DIAMIDES

Joseph E. Fields and John H. Johnson, Dayton, Ohio, assignors to Monsanto Chemical Company, St. Louis, Mo., a corporation of Delaware No Drawing. Application November 29, 1957
Serial No. 699,472

4 Claims. (Cl. 260—78)

The present invention relates to derivatives of aliphatic olefin-maleic anhydride copolymers and more particularly provides a new and valuable process for the preparation of the diamides of said copolymers.

Olefin-maleic anhydride copolymers are well known in the art, being obtained, e.g., by methods well known in the art. Generally, the copolymers are prepared by reacting a $C_2$ to $C_4$ olefin, e.g., ethylene, propylene, 1- or 2-butene or mixtures thereof, with maleic anhydride in the presence of an aliphatic or aromatic hydrocarbon which is a solvent for the monomers but is a non-solvent for the copolymer which is formed. Suitable solvents include benzene, toluene, xylene, chlorinated benzene, hexane, ethylenedichloride and the like. While benzoyl peroxide is the commonly employed catalyst, other peroxidic catalysts such as acetyl peroxide, di-tert-butyl peroxide or cumene hydroperoxide may be used instead. Instead of the peroxidic catalysts, azo-type, e.g., $\alpha,\alpha'$-azodiisobutyronitrile, may be employed. The copolymer contains substantially equimolar quantities of the aliphatic olefin moiety and the maleic anhydride moiety. The properties of the copolymer, such as molecular weight, for example, may be regulated by proper choice of catalyst and control of one or more of the variables such as reactants, temperature and catalyst concentration. The product is obtained in solid form and is easily recovered by filtration, centrifugation, and the like. The maleic anhydride copolymers thus obtained have the formula $$\left[ -Z-\underset{\underset{O}{\underset{\diagdown \diagup}{}}}{\overset{CH-CH-}{\underset{O=C}{|}\ \underset{C=O}{|}}} \right]_n$$

where Z is an alkylene radical of from 2 to 4 carbon atoms and $n$ denotes the degree of polymerization, generally from, say, 10 to 10,000.

Said anhydride copolymers are readily hydrolyzed by heating with water to yield the acid form of the copolymer:

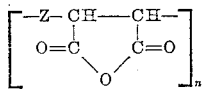

In the prior art the said anhydride copolymers have been readily converted to water-soluble mono-amides, ammonium salts, or half-amide, half-salts by reaction with ammonia or ammonium hydroxide. Thus, by reaction of the copolymer in its anhydride or acid form with the stoichiometric quantity of ammonium hydroxide, there is formed either (I) the mono-ammonium or (II) the di-ammonium salt of the acidic copolymer:

(I)         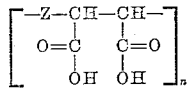

(II)        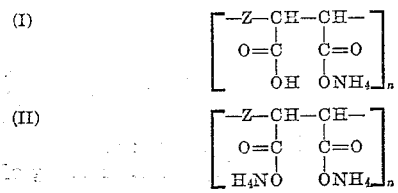

Reaction of the olefin-maleic anhydride copolymer with ammonia gas, either at ordinary or increased temperature in the prior art has resulted in formation of either the half-amide (III) or the half-amide, half-ammonium salt (IV):

(III)       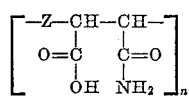

(IV)        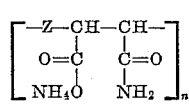

In the preparation of (IV), heat is generally liberated to so great an extent that it is desirable to provide some means for dissipating it so that fusion and a crosslinking of the polymer chains will not be effected by excessively high temperature. One means for controlling the heat of reaction consists of suspending the solid olefin-maleic anhydride copolymer in an inert organic liquid such as benzene and bubbling ammonia through the slurry. Heat is then removed by refluxing the liquid in known manner.

Although it would appear that the half-amide, half-ammonium salt could be dehydrated by heating to yield the diamide, in actual practice heating said amide-salt at temperatures of from, say, 60° C. to 150° C. results in the production of the imide:

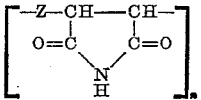

Accordingly, insofar as is known, the prior art has not provided a means of obtaining diamides from aliphatic olefin-maleic anhydride copolymers. The present invention provides such a means. We have found that said anhydride copolymers are readily converted to the diamides

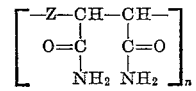

by a process which includes the step of heating the half-amide, half-ammonium salt with ammonia under superatmospheric pressure. Production of the diamide may be effected by starting with a preformed half-amide, half-ammonium salt and heating it with ammonia under pressure, or by heating the anhydride copolymer under pressure with the stoichiometric quantity of ammonia required for conversion of an intermediately formed half-amide, half-ammonium salt to the diamide, i.e., at least three molar equivalents of ammonia per mole of the anyhdride copolymer.

In starting with the half-amide, half-ammonium salt, we operate substantially as follows: The amide-salt and liquid ammonia is charged to a cooled pressure vessel such as an autoclave or rocking bomb. The vessel is then sealed and heated to a temperature of from, say, 50° C. to 150° C., during which time there is developed a pressure of from, say, 100 p.s.i. to 5,000 p.s.i., depending upon the temperature employed. The period of heating is a function of the temperature, long heating being required for maximum conversion at the lower temperature limits than is required at higher temperatures. Completion of the reaction may be readily ascertained by cessation of pressure drop. The reaction may also be affected by passing gaseous ammonia into the half-amide, half-ammonium salt in a closed system and heating to an autogenous pressure of, say, from 100 p.s.i. to 5,000 p.s.i.

Instead of starting with the half-amide, half-ammonium salt, the diamide is likewise obtainable by working with the olefin-maleic anhydride copolymer and ammonia as the initial reactants. In this case, the anhydride copolymer is mixed with the liquid or gaseous ammonia in a quantity sufficient to convert an intermediately formed half-amide, half-salt to the amide, i.e., with at least three molar equivalents of the ammonia. A large excess of ammonia is preferably used. Since, as has been pointed out above, conversion of the anhydride copolymer to the half-amide, half-salt is an exothermic reaction, no external heating is generally employed until the initial exothermic reaction has subsided. The reaction mixture is then heated in a closed system to a pressure which may be up to 5,000 p.s.i. until diamide formation is completed. Alternatively, the diamide formation can be effected simply by ultilizing, instead of dissipating, the initial exothermic heat; this procedure depends, of course, on the reaction equipment, reactant quantities and reaction time. Depending on these factors, super-atmospheric pressure may be used throughout the reaction or only after the initial temperature rise has subsided. Conversion of the half-amide, half-salt to the diamide requires operation under super-atmospheric pressure. On the other hand, formation of the half-amide, half-salt may be effected at either atmospheric, super-atmospheric or sub-atmospheric pressure.

Whereas good conversion of the half-amide, half-salt to the diamide is effected in the absence of a catalyst, the reaction may be accelerated and operating temperature reduced by working in the presence of a catalytic quantity, say, up to 5.0% by weight of the total reaction mixture, of a catalyst such as sodamide, urea, ammonium chloride, or ammonium benzoate or acetate, etc. The condensation may also be accelerated by providing a means of removing the water formed, whereby reaction is shifted in the direction of amide formation. Thus there may be incorporated into the reaction mixture a material which forms a stable hydrate at the reaction temperature, e.g., lime. There may also be used a slow stream of ammonia at the elevated temperature and pressure in order to carry off the water as it is formed.

The diamides prepared according to the invention possess very effective flocculating ability and have exceptional tolerances for cations which increase their utility for flocculating crude solutions. This characteristic is shared by neither the half-amides nor the half-amides, half-salts of the olefin-maleic anhydride copolymers. The presently prepared diamides are also advantageously employed as latex thickening agents in the formulation of rubber-base coatings, as pigment dispersants, printing paste thickeners, soil-conditioners, polymerization suspending agents, etc.

The invention is further illustrated, but not limited, by the following examples:

Example 1

An ethylene-maleic anhydride copolymer having a specific viscosity of 0.624 (determined for a 1% solution in dimethylformamide at 25° C.) was converted to the half-amide, half-ammonium salt by passing ammonia into 350 g. of the stirred anhydride copolymer until heat evolution and ammonia absorption had ceased. There was thus obtained 450 g. of the amide-salt, a white powder which dissolved to give a clear solution in water.

The amide-salt was converted to the diamide by charging 100 g. thereof and 432 g. of liquid anhydrous ammonia to a rocking bomb, gradually heating the sealed bomb to 101° C. at which point the autogenous pressure was 1,000 p.s.i., and continuing the heating at a temperature of about 100° C. for another 17 hours. The pressure at the end of this time was 925 p.s.i. The resulting brownish amber mass was broken up, removed from the bomb, and dried in an oven at 58° C. for 12 hours under full vacuum to give the substantially pure diamide of the ethylene-maleic anhydride copolymer, analyzing 18.7% nitrogen as against 19.72%, the calculated value for the polymer:

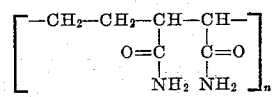

The dried, diamidated product was soluble in water and in contrast to the half-amide, half-ammonium salt, readily flocculated kaolin suspensions. Titration of the present diamide product with aqueous sodium hydroxide showed that it contained substantially no carboxy groups.

Example 2

An ethylene-maleic anhydride copolymer having a specific viscosity of 2.13 (defined in Example 1) was converted to the half-amide half-ammonium salt substantially as described in Example 1. This was then mixed in a cooled bomb with a large molar excess (ca 1:30) of liquid ammonia, and the resulting mixture heated in the rocking steel bomb for 18 hours at 100° C. under autogenous pressure. The resulting product, comprising the diamide of the ethylene-maleic anhydride copolymer, was cooled, vacuum dried, and tested for cation tolerance as follows:

A 1% solution of the product was prepared, the pH of the solution was adjusted to approximately 8, and 10 ml. of the resulting solution was pipetted into a ¾" x 1¼" x 2" glass cell. A piece of standard 8 point newsprint was attached to the back of the cell. While agitating the solution in the cell by means of a magnetic stirrer bar, 10 ml. of a 5% aqueous calcium nitrate solution was added from a burette. At this point, the newsprint was thoroughly visible when viewed through 1¼" of the solution. This shows very good cation tolerance of the diamide product herein obtained. On the other hand, when the half-amide, half-ammonium salt, instead of the present diamide, was subjected to the same test, after only 1.40 ml. of the aqueous calcium nitrate had been added, there occurred a complete, permanent extinction of the newsprint when viewed through 1¼" of the solution.

The presently obtained polymeric diamide was also tested for flocculent property as follows:

A kaolin type clay having a natural pH of 5.25 was slurried by mechanical agitation of 250 ml. of a 1% aqueous suspension thereof. This was then poured into a 250 ml. graduated cylinder, and 0.5 ml. of a 1% aqueous solution of aluminum nitrate was added. After careful mixing by inverting the graduate for 5 cycles the graduate with its contents was allowed to stand for 5 minutes. At the end of that time, 1.0 ml. of an 0.1% aqueous solution of the present diamide product was added and the whole again carefully mixed by inverting for 5 cycles. The settling rate (defined as the time necessary to settle the main body of the clay flocs) was timed immediately after mixing, a background light being employed for this purpose. It was found to be 80 seconds for the present copolymer diamide as compared to over 300 seconds, the value obtained by employing the half-amide, half-ammonium salt of ethylene-maleic anhydride copolymer in the same test.

Infra red spectroscopy of the copolymer diamide of the present example showed an absorption band at $3.05\mu$ (typical of amide $NH_2$ stretching) and either none or only a very faint band at $6.48\mu$ (ionized carboxyl).

Example 3

An ethylene-maleic anhydride copolymer having a specific viscosity of 0.65 (determined as in Example 1) was converted to the half-amide, half-ammonium salt as in Example 1, and mixed with about 30 molar equivalents of liquid ammonia in a steel rocking bomb. Heating of the sealed bomb for 18 hours at 100° C. gave the diamide of ethylene-maleic anhydride copolymer having a cation tolerance of 10 as compared to 1.40 for the initial half-amide, half-ammonium salt.

*Example 4*

In this example an ethylene-maleic anhydride copolymer having a specific viscosity of 1.08 (determined as in Example 1) was converted to a half-amide, half-ammonium salt substantially as in Example 1, mixed with a large excess of liquid ammonia and heated in a sealed vessel for 18 hours at 100° C. The resulting copolymer diamide was found to have a settling time of 85 seconds when tested by the flocculent test of Example 2.

*Example 5*

In this example the procedure of Example 4 was repeated except that the initially employed ethylene-maleic anhydride copolymer had a viscosity of 2.34. The copolymer diamide thereby obtained had a settling time of 82 seconds when tested by the flocculent procedure of Example 2, whereas the settling time of the unreacted half-amide, half-salt was over 300 seconds.

*Example 6*

In this example there is shown some catalytic effect of ammonium chloride in preparation of the diamide.

An ethylene-maleic anhydride copolymer having a viscosity of 2.13 cps. was converted into the half-amide, half-salt, and then mixed with a large molar (1:30) excess of liquid ammonia and a small quantity (less than 5% by weight of the amide-salt) of ammonium chloride. After 18 hours at 100° C. in a steel rocking bomb, there was obtained a copolymer diamide having a settling time of 77 seconds as determined by the flocculent test of Example 2.

*Example 7*

Isobutylene-maleic anhydride copolymer was converted to the half-amide, half-ammonium salt by reaction with gaseous ammonia while stirring in a cooled flask. The thus-obtained amide salt was then mixed with a large molar excess of liquid ammonia (ca 1:30) and heated in a steel rocking bomb at 135° C. for 30 minutes. Conversion of the half-amide, half-salt into diamide was evident by a decrease in settling time as compared to the unreacted amide-salt by the flocculent test described in Example 2.

*Example 8*

Ethylene-maleic anhydride copolymer having a specific viscosity of 2.004 (determined as in Example 1) was converted to the half-amide, half-ammonium salt by passing gaseous ammonia into 300 g. of the stirred anhydride copolymer until heat evolution and ammonia absorption (as measured by a bubbler tube on the exit line) had ceased. There was thus obtained 393 g. of the half-amide, half-ammonium salt of the ethylene-maleic anhydride copolymer.

Conversion to diamide was effected as follows: A mixture consisting of 100 g. of said amide-salt, 18 g. of ammonium chloride and 432 g. of liquid ammonia was charged to a steel rocking bomb and heated at 74–76° C. for about 2.5 hours. During this time, the pressure in the reaction vessel was observed to be from 600 to 650 p.s.i. The resulting diamide was cooled, comminuted, and held in a vacuum oven overnight at 60° C. to remove any excess of ammonia. Unlike the half-amide, half-salt from which it was prepared, the present diamidated product was found to flocculate kaolin clay slurries. Also, unlike aqueous solutions of the half-amide, half-salt which are highly viscous, aqueous solutions of the same concentrations of the present diamide are thin liquids. This indicates virtual absence of ionized carboxyl salts in the diamide product.

What we claim is:

1. In the process of preparing polyamides from aliphatic olefin-maleic anhydride copolymers, the step which comprises heating an amide-salt of the formula

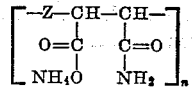

where Z is an alkylene radical of from 2 to 4 carbon atoms and $n$ is a number having a value of 10 to 10,000 with ammonia at a temperature of 50° C. to 150° C. and at a pressure of from 100 p.s.i. to 5,000 p.s.i., and recovering from the resulting reaction product a copolymer of the formula

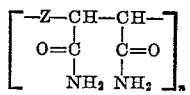

wherein Z and $n$ are as herein defined.

2. In the process of preparing polyamides from ethylene-maleic anhydride copolymers, the step which comprises heating an amide-salt of the formula

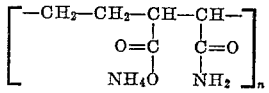

where $n$ is a number having a value of 10 to 10,000 with ammonia at a temperature of 50° C. to 150° C. and a pressure of from 100 p.s.i. to 5,000 p.s.i., and recovering from the resulting reaction product a copolymer of the formula

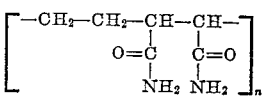

in which $n$ is as herein defined.

3. In the process of preparing polyamides from ethylene-maleic anhydride copolymers, the step which comprises heating an amide-salt of the formula

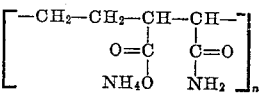

wherein $n$ is a number having a value of from 10 to 10,000 with ammonia at a temperature of 50° C. to 150° C., at a pressure of from 100 p.s.i. to 5,000 p.s.i. and in the presence of catalyst, and recovering from the resulting reaction product a copolymer of the formula

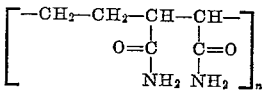

in which $n$ is as herein defined.

4. In the process of preparing polyamides from ethylene-maleic anhydride copolymers, the step which comprises heating an amide-salt of the formula

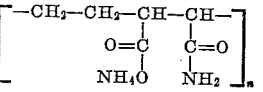

wherein $n$ is a number having a value of from 10 to 10,000 with ammonia at a temperature of 50° C. to 150° C., at a pressure of from 500 p.s.i. to 5,000 p.s.i. and in the presence of ammonium chloride as catalyst and recovering from the resulting reaction product a copolymer of the formula

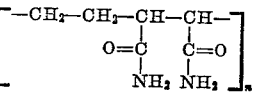

in which $n$ is as herein defined.

(References on following page)

References Cited in the file of this patent

UNITED STATES PATENTS

| | | |
|---|---|---|
| 2,168,535 | Nuesslein et al. | Aug. 8, 1939 |
| 2,456,177 | Cupery | Dec. 14, 1948 |
| 2,652,323 | Mowry et al. | Sept. 15, 1953 |
| 2,712,003 | Bowen | June 28, 1955 |

FOREIGN PATENTS

| | | |
|---|---|---|
| 734,714 | Great Britain | Aug. 3, 1955 |

OTHER REFERENCES

Heiligmann et al.: Industrial & Engineering Che., January 1952, vol. 44, No. 1, pages 113 through 116. (Copy in Sci. Libr.)